United States Patent [19]
Boukrinskaia et al.

[11] Patent Number: 5,880,154
[45] Date of Patent: Mar. 9, 1999

[54] POLYMERIC ADAMANTANE ANALOGUES

[75] Inventors: Alissa G. Boukrinskaia; Alexander V. Serbin; Olga P. Bogdan; Lena L. Stotskaya, all of Moscow, Russian Federation; Irina V. Alymova, Karaganda, Kazakhstan; Yurii N. Klimochkin, Samara, Russian Federation

[73] Assignee: The Board of Regents of the University of Nebraska, Lincoln, Nebr.

[21] Appl. No.: 682,654

[22] PCT Filed: Feb. 1, 1994

[86] PCT No.: PCT/US94/01138

§ 371 Date: Jul. 26, 1996

§ 102(e) Date: Jul. 26, 1996

[87] PCT Pub. No.: WO95/20951

PCT Pub. Date: Aug. 10, 1995

[51] Int. Cl.$^6$ .............. C08F 22/06; C08F 22/16; A61K 31/195; A61K 31/19
[52] U.S. Cl. .............. 514/561; 514/571; 525/327.6; 525/327.7
[58] Field of Search .............. 514/561, 571; 525/327.6, 327.7

[56] References Cited

U.S. PATENT DOCUMENTS

| | | | |
|---|---|---|---|
| 2,937,211 | 5/1960 | Ludwig | 585/352 |
| 3,152,180 | 10/1964 | Haaf | 564/125 |
| 3,974,128 | 8/1976 | Block et al. | 525/327.6 |
| 4,309,413 | 1/1982 | Fields et al. | 424/78.21 |
| 4,661,512 | 4/1987 | Laurelle et al. | 514/423 |
| 4,980,371 | 12/1990 | Parker et al. | 514/461 |
| 4,992,427 | 2/1991 | Nair | 514/45 |

OTHER PUBLICATIONS

Chemical Abstracts, vol. 113(12),abst.No. 106, 502g,published Sep. 17, 1990.
Chemical Abstracts, vol. 113(14),abst.No. 117, 183e,published Oct. 1, 1990.
Chemical Abstracts, vol. 114,(60abst.No. 52,635c, published Feb. 11, 1991.
Rytik, P., 1991, Susceptibility of Primary Human Glial Fibrillary Acidic Protein–Positive Brain Cells To Human Immunodeficiency Virus Infection in vitro: Anti–HIV Activity of Memantine, *Aids Research and Human Retroviruses*, 7(1):89–95, Mary Ann Liebert, Inc., Publishers.

*Primary Examiner*—Alan L. Rotman
*Attorney, Agent, or Firm*—Zarley, McKee, Thomte, Voorhees & Sease

[57] ABSTRACT

Novel polymeric adamantane analogues are disclosed comprising adamantane linked by means of a spacer group to an anionogenic polymeric carrier which creates a membranotropic composition. The compounds are nontoxic and possess potent anti-viral activity against HIV-1. Methods of preparation as well as pharmaceutical compositions are also disclosed.

24 Claims, 4 Drawing Sheets

POLYMERIC ADAMANTANE ANALOGUES

CROSS-REFERENCE

This application is a §371 of PCT/US94/00138 filed Feb. 1, 1994.

BACKGROUND OF THE INVENTION

Adamantane (Tricyclo[3,3,1,1$^{3,7}$]decane) has the following structural formula:

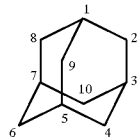

As can be seen from the structure, each of the carbon atoms is a member of at least two of the four-ring systems, all of which are equivalent. Consequently this structure is exceptionally rigid and allows virtually no movement of the individual atoms. This feature and the symmetry of the molecule are responsible for a great extent of unusual physical and chemical properties exhibited by adamantane.

First uses of this compound included modifications with an amino group (termed amantadine or adamantanamine) (Tricyclo[3,3,1,1$^{3,7}$]decan-1-amine). Amantadine was shown to have utility as an anti-viral agent against certain strains of influenza A virus. Other amino-substituted derivatives have included amantadine hydrochloride(1-adamantanamine hydrochloride) inhibitors of influenza virus replication in cell culture and influenza infection in humans (Hay, A. G. et al (1985) Molecular basis of the specific anti influenza action of amantadine. EMBO J4:3021–3024. Other related derivatives of amantadine have also been developed. See generally U.S. Pat. No. 4,661,512, adamantanamine derivatives, processes for the preparation and drugs in which they are present. These amino-substituted derivatives have generally been touted for use as anti-viral agents against various strains of influenza A virus.

To date very little has been investigated for the base compound, non-amine substituted adamantane, as an anti-viral agent. There is always a need for development of antiviral substances which may be administered safely without toxic side effects. With the advent of the viral disease Acquired Immune Deficiency Syndrome (AIDS) the need only increases further.

It is an object of the present invention to provide novel polymeric adamantane analogues which have been shown to have potent anti-viral activity against Human Immunodeficiency Virus-1 (HIV-1), processes for their preparation and drugs in which they are present.

SUMMARY OF THE INVENTION

This invention relates to new adamantane analogues and to polymeric adamantane analogues modified to specifically direct the compound to the plasma membrane of host cells, comprising a non-toxic water soluble anionogenic polymer carrier and an adamantane derivative chemically linked to the carrier by use of a spacer group. The compounds of the present invention were shown to inhibit HIV 1 infection in lymphoblastoid cells. Methods for synthesis are also disclosed.

3. lanes 1,4,7—untreated cells; lanes 2,3,5,6—cells treated with 200 (lanes 2,5) and 400 $\mu$g ml$^{-1}$ (lanes 3,6) of 342 and 343, respectively; lanes 8,9—cells treated with 200 and 400 $\mu$g ml$^{-1}$ of 342, respectively.

Figure 4:
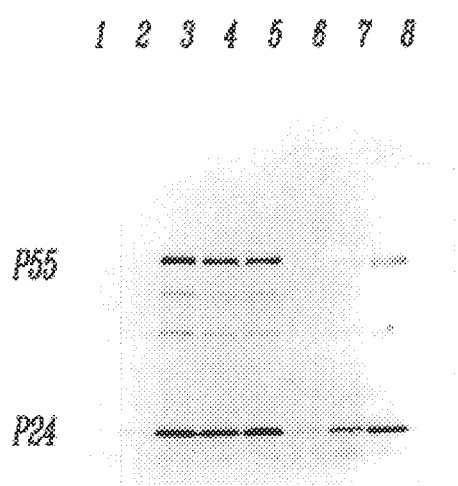

FIG. 4 is a photograph demonstrating the antiviral effect after cell pretreatment with drugs. The cells were pretreated with compounds 342, 337 and 336, adamantane component or the carrier two hours before virus adsorption. Forty-eight hours after infection, the proteins in cell lysates were detected by immunoblotting using seropositive sera. lane 1—150 $\mu$g ml$^{-1}$ of 342; lane 2—32 $\mu$g ml$^{-1}$ of the adamantane component; lane 3—118 $\mu$g ml$^{-1}$ of the carrier; lanes 4,5—untreated cells; lane 6—150 $\mu$g ml$^{-1}$ of 337; lanes 7,8—400 $\mu$g ml$^{-1}$ of 336 added 2 hours before virus adsorption (7) or 4 hours after virus adsorption (8).

FIGS. 5$a$ and 5$b$ are photographs demonstrating the effect of 342, rimantadine and amantadine hydrochlorides on HIV replications. 5$a$. lane 1—untreated cells; lanes 2–5—130 $\mu$g ml$^{-1}$ of 342 added 2 hours before virus adsorption, 2,4, and 20 hours after infection, respectively; lanes 6–9—130 $\mu$g ml$^{-1}$ of amantadine added 2 hours before adsorption, 2,4, and 20 hours after infection, respectively. 5$b$. lane 1—untreated cells; lanes 2–12—the cells were pretreated with drugs 2 hours before virus adsorption; lane 2—150 $\mu$g ml$^{-1}$ of 342; lane 3—32 $\mu$g ml$^{-1}$ of adamantane component; lane 4—118 $\mu$g ml$^{-1}$ of the carrier; lanes 5,6—32 $\mu$g ml$^{-1}$ of amantadine; lane 7—32 $\mu$g ml$^{-1}$ or rimandatine; lanes 8–12—amantadine at concentrations of 2,5,10,25, and 32 $\mu$g ml$^{-1}$, respectively.

Figure 6:
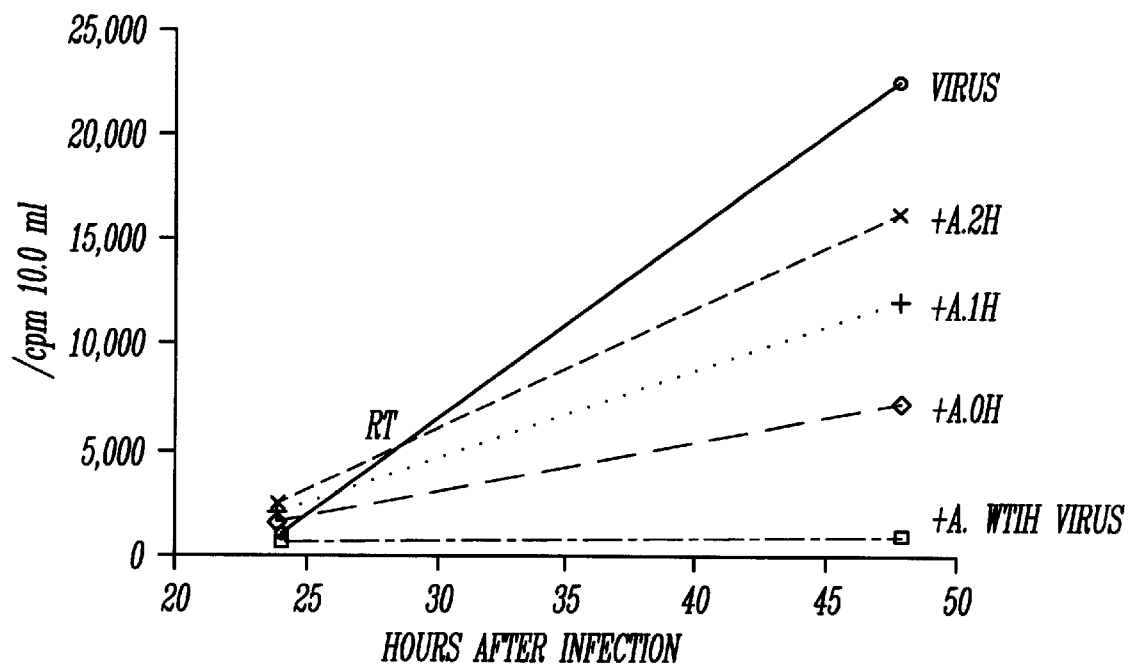

FIG. 6 is a graph depicting addition of AS343 at different time periods relative to introduction of the virus.

DETAILED DESCRIPTION OF THE INVENTION

Compounds of the present invention have the following general formula:

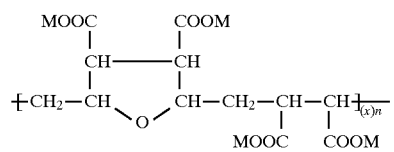

-continued

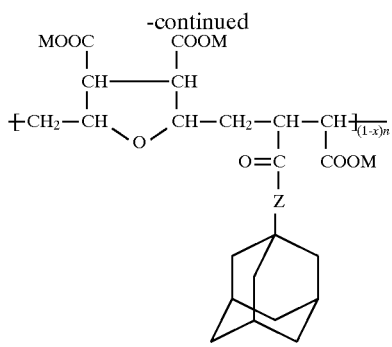

wherein X is 0.10 to 0.25;

n is the respective degree of polymerization approximately 30–50;

z is a spacer group a-b; where a is NH or O with NH preferred, and b is a lower alkylene $C_1$ to $C_8$ with $C_1$ or $C_2$ preferred; and M is an alkali metal, hydrogen or an amino group.

Preferred compounds synthesized according to the invention are as follows:

| Name  | X Substituent | Z Substituent  | n     |
|-------|---------------|----------------|-------|
| AS342 | .21           | NH - ethylene  | 30–50 |
| AS343 | .12           | NH - ethylene  | 30–50 |
| AS336 | .19           | NH - methylene | 30–50 |
| AS337 | .10           | NH - methylene | 30–50 | with AS343 (x=0.12 and Z=ethyl) being the most preferred. These drugs strongly inhibit HIV-1 when added either just after adsorption or during the first hours after adsorption. The most profound anti-viral effect was seen when the cells were pretreated with the drugs.

The compounds have anti-viral activity both in HIV infection of T-cells and in its infection of primary monocyte-derived macrophages. The anti-viral properties are manifest at concentrations which are far below those which influence the viability of host cells.

Targets for anti-viral therapy of HIV infection (that can be blocked selectively by inhibitors) traditionally have been enzymes such as reverse transcriptase and viral protease. At the same time, membranotropic drugs would be expected to interfere with the HIV infectious cycle through their effect on viral and cellular membranes which are involved in virus replication, a number of steps including cell entry, transport of viral components, and virus maturation.

These adamantane polymers have been specifically modified in order to direct the compound to the plasma membrane of cells susceptible to HIV infection. Generally speaking the compounds of the present invention consist of two parts. A nontoxic water soluble anionogenic polymer carrier with a molecular weight of 5–15 kD, and an adamantane derivative chemically linked to the carrier through spacer chemical groups of different length, structure, configuration and mobility. Quite unexpectedly, the anti-viral effects against HIV were shown to be quite potent despite the fact that amantadine and rimantadine hydrochloride exhibited either no anti-viral activity or only slight activity against HIV.

PREPARATION OF THE ADAMANTANE POLYMERS

In general, synthesis of these compounds includes two steps: first an adamantane containing substance (adamantane and a spacer of $C_1$ to $C_8$ carbons)such as 2-1(adamantyl ethylamine or 2-(1-adamantyl methalyamene etc. is reacted with a copolymer (n=30–50) of maleic anhydride and divinyl ether, or some other oxygen containing monomer. The adamantane substance is added to the polymeric matrix via reaction of the spacer with the polyhmer backbone. The reaction is at stoichiometric amounts, excesses give no advantage. The two are mixed in solution at standard temperature and pressure for approximately 12 to 48 hours (24 preferred). A nonsolvent is added to precipitate the product.

The reaction of these two compounds leads to a preproduct which is then hydrolyzed under standard conditions (stoichiometric amounts) resulting in a water soluble substance.

PREPARATION OF AS343

The 343 analogue was prepared as described earlier, the reaction scheme is set out below:

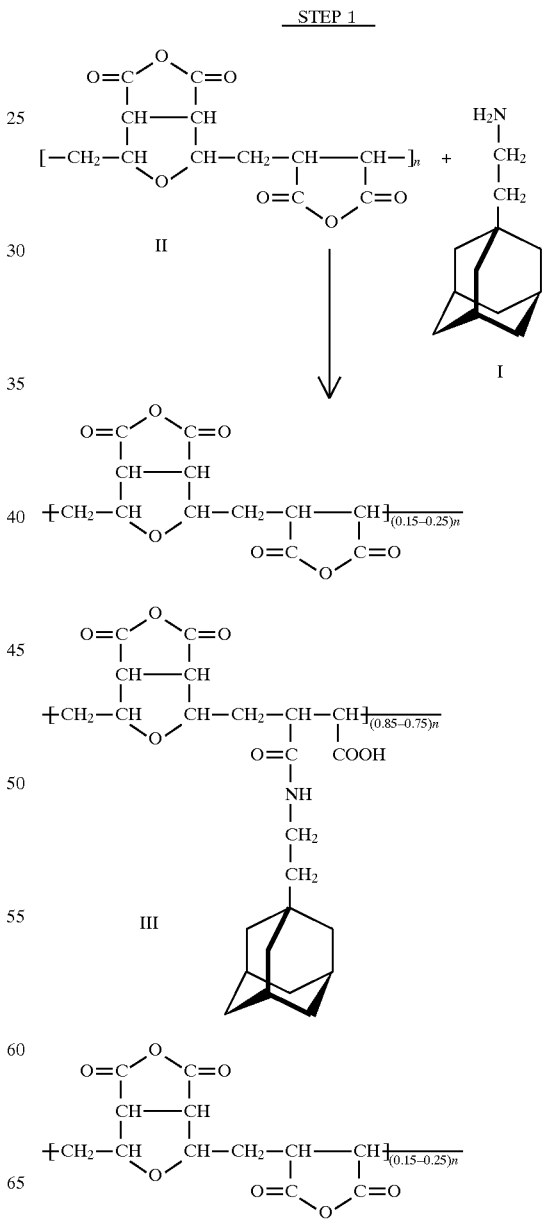

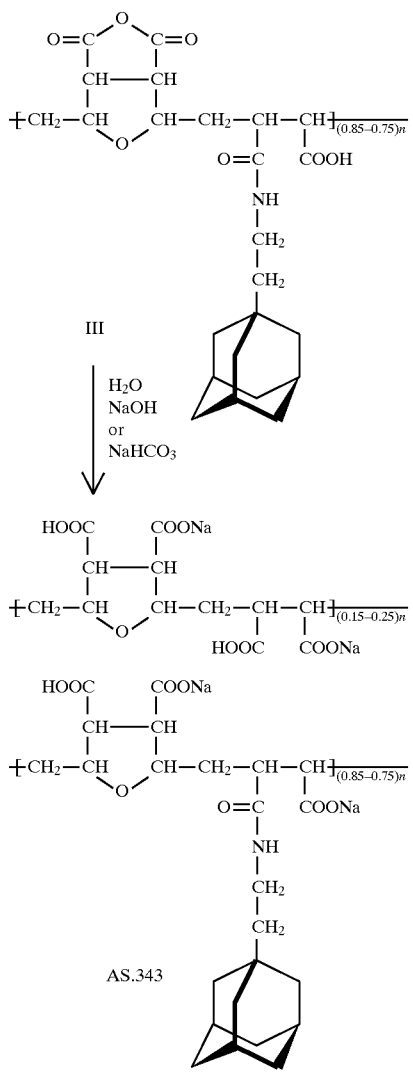

2-(1-adamantyl) ethylamine (compound I) was reacted with a maleic anhydride and divinyl ether polymer n=30–50 (compound II) to form compound III which was then hydrolyzed to AS343.

More specifically 0.16 grams of Compound I were dissolved in 3–10 ml dry nonprotonated polar organic solvent such as DMSO, amides, ketones, etc. to create solution A.

Next 1.0 gram of compound II was dissolved in 5–15 ml analogous solvent (for example DMSO) to create solution B. Solution A was added into solution B by drops under effective mixing conditions during 5–25 minutes at room temperature.

The prepared mixture was stored for 24 hours at room temperature or for 2 hours at 40° C. under air-water isolated conditions. The mixture was added dropwise under effective mixing into 50–500 ml nonsolvent compound for II such as hydrocarbons (pentane hexane; heptane benzene), diethyl ether, dichloro methane or into cool water. The formed precipitate (compound III) was then isolated by filtration and dried in vacuum to retrieve the resulting compound.

Another sample preparation of step one included taking 0.19 grams of amantadine hydrochloride and dissolving this in an amide solvent such as dimethyl formamide or n-methyl pyrrolidone to create solution A. Solution B remained the same. Solution A and solution B were then mixed with one another and 0.08 grams of triethylamine solution was added into the mixture (by drops in the same solvent). Precipitated triethylamine hydrochloride (by product) was isolated by filtration. Again a solvent such as hydrocarbon (pentane hexene); heptane benzene etc. was added and the resulting precipitate (III) was isolated by filtration.

The second step of the synthesis comprised adding the precipitated product (compound III) into 0.3 grams of NaOH (or 0.7 grams $NaHCO_3$) water solution and was dissolved during 2–3 hours at 40° C. under mixing conditions. The obtained solution was purified against low molecular weight admixtures by distilled water washing an ultra filtration cell with (<1000) dalton pores diameter membrane. From the purified solution 1.3 grams of the resulting compound AS343 were isolated by liophylic dry.

The purity and structure of AS343 were controlled by means of elemental analysis, thin layer chromatography, IR-NMR-spectometry. The resulting AS343 is a white powder best soluble in water medias. Other compounds of the invention may be similarly made and variations can include use of a methylene group as the spacer as opposed to the ethylene group.

Compounds synthesized according to the invention included AS342 (X=0.21 Z=ethylene); AS343 (X=0.12 Z=ethylene); AS336 (X=0.19 Z=methylene); and AS337 (X=0.10 Z=methylene).

TOXICITY AND ANTI-VIRAL ACTIVITY

To test the compounds of the present invention for anti-viral activity against HIV-1, MT4 cells were grown on RPMI1640 supplemented with 20% fetal calf serum in a $CO_2$ atmosphere. HIV-1 was produced by H9/IIIB cells and used for cell infection at a multiplicity of infection about 0.2–0.5 tissue culture infectious units per cell. Adsorption was performed for two hours at 37° C. Then, the virus was removed and the cells were washed with phosphate buffered saline (PBS) pH 7.2.

The cells were either pretreated with drugs for two hours, or the drugs were added after infection or later. Culture supernatants were removed and tested for virus production with an HIV gag p24 antigen capture assay 48 hours after infection. The cell lysates were obtained by ultrasonic treatment of the cells and tested for virus-specific protein by immunoblotting using seropositive sera from AIDS patients or monoclonal antibody against p24.

These compounds were tested for cytotoxic effects by determining incorporation of [H]-thymidine into the acid-insoluble fraction. [$^3$H]-thymidine (4 $\mu$CI per $10^5$ cells) was added for 1 hour then the cells were washed by PBS, disrupted by treatment with 1% Triton X-100 and the radioactivity was counted in the acid insoluble fraction. Assay of the four compounds studied showed that concentrations of up to 400 $\mu$g/ml (approximately 35 $\mu$Mole of adamantane component) did not reduce the amount of [$^3$H] radioactivity incorporated after exposure of cells to [$^3$H] thymidine but instead slightly enhanced uptake from 75÷85/ $10^4$ to 90÷120/$10^4$ CPM. This is highly significant as other HIV anti-viral agents such as AZT have been shown to be toxic at concentrations of 10 $\mu$M.

Figure 1:
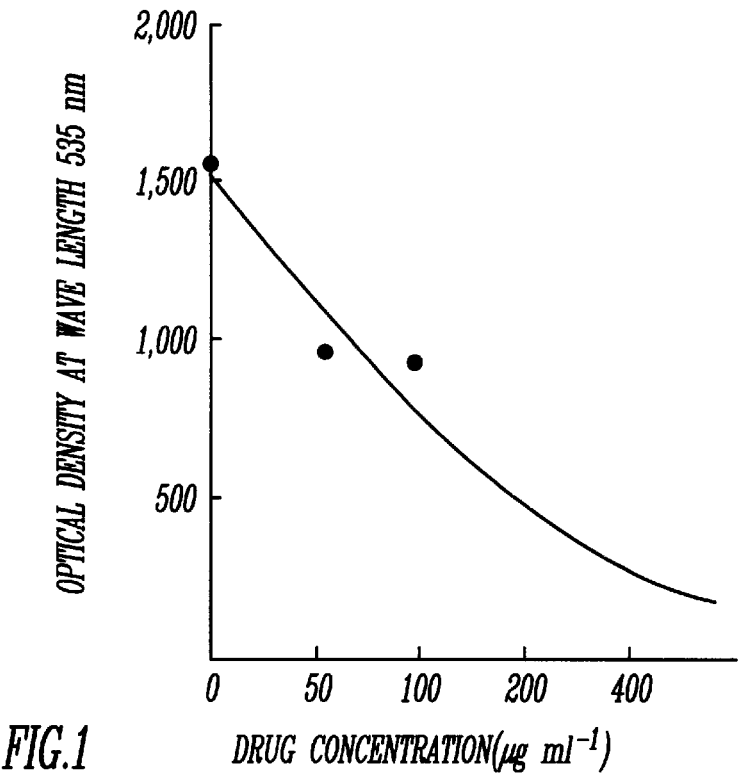
FIG. 1 is a graph demonstrating inhibition of HIV-1 replication in MT4 cells by AS342 measured by optical density of samples in ELISA. HIV-1 infected cells were treated just after infection with increasing concentrations of AS342. Forty-eight hours after infection, p24 antigen production was measured in supernatents by a p24 capture assay.
Figure 2:
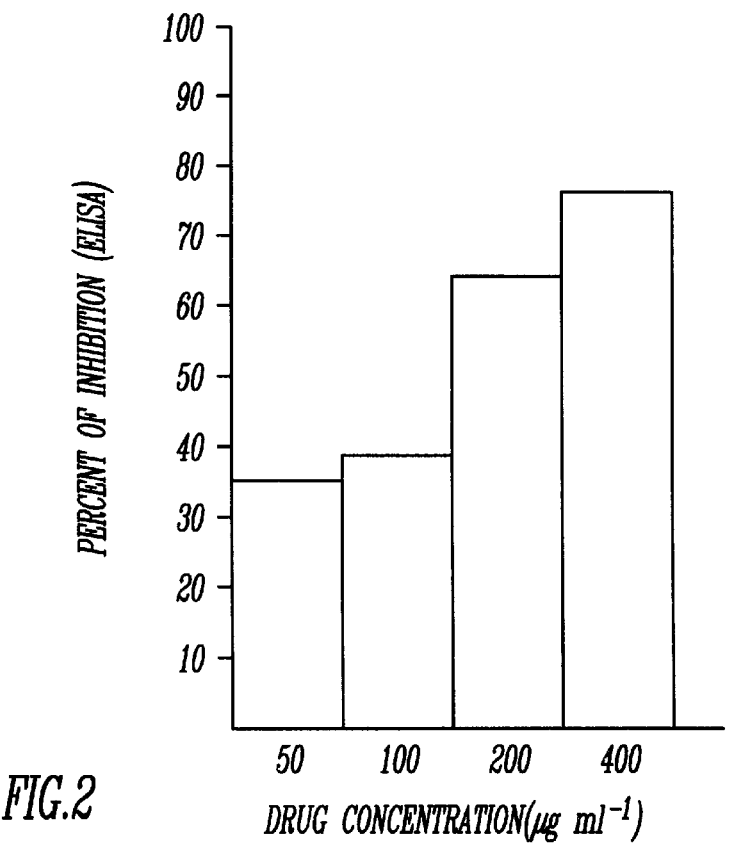
FIG. 2 is a graph demonstrating Inhibition of HIV-1 as in FIG. 1, as measured by percent of virus inhibition by increasing concentrations of the drug.

Accordingly the compounds were used at final concentrations of 50–400 $\mu$g/ml added either two hours before virus adsorption during adsorption or intervals after adsorption. For anti-viral activity, FIGS. 2A and 2B show the effects of compounds AS342 on virus production when administered just after virus adsorption. Virus production was measured 48 hours after infection using an ELISA technique which measures p24 antigen production in supernatants. It can be seen that the optical density (at wave length 535 nm) gradually decreases with increasing concentration of the compound, at 400 µg/ml the amount of HIV progeny is reduced about 75% compared to the non-treated control.

Figure 3:
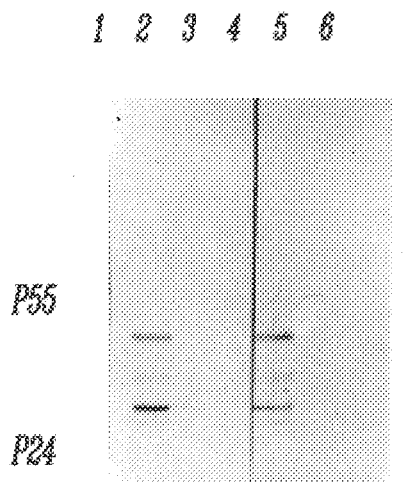
FIG. 3 is a photograph demonstrating the effect of the drugs on viral replication as revealed by immunoblotting. The cells were treated with either AS342, AS343 or the drug carrier just after virus adsorption. Forty-eight hours after infection, cell lysates were obtained by ultrasonic treatment of the cells. The proteins were resolved by 10% SDS-polyacrylamide gel electrophoresis and detected by immunoblotting using seropositive sera and monoclonal antibody against p24 (7–9).

The antiviral effects of these drugs were also monitored using inhibition of viral protein synthesis in drug-treated cells. FIGS. 3–5 show the results of immunoblotting 48 hours after infection. The polyprotein p55, intermediate precursors p41 and p39 (Mervis et al., 1988 The Gag Gene Products of HIV-1: Alignment Within the Gag Open Reading Frame, Identification of Posttranslational Modification and Evidence for Alternative Gag Precursors. J Virol 62:3993–4002) and the final product of protein cleavage, the mature core protein p24, are readily visualized in the untreated cell controls, whereas the other products of p55 cleavage, p17 and p7/p6 are not detected under these conditions.

FIG. 3a shows that 200 µg/ml of both drugs AS342 and AS343 essentially inhibit and at 400 µg/ml fully block viral replication. The more pronounced amount of p24 detected as compared to p55 could be explained by its accumulation in the cells as a cleavage product of the pre-existing precursor molecules, whereas the synthesis of the nascent p55 molecules is arrested.

A stronger anti-viral effect is produced when the cells were pretreated with the compounds. FIG. 4 shows the compounds 342 and 337 arrested viral protein synthesis at a concentration of 150 µg/ml when added 2 hours before adsorption, with compound 336 producing a lower effect.

Figure 5A:
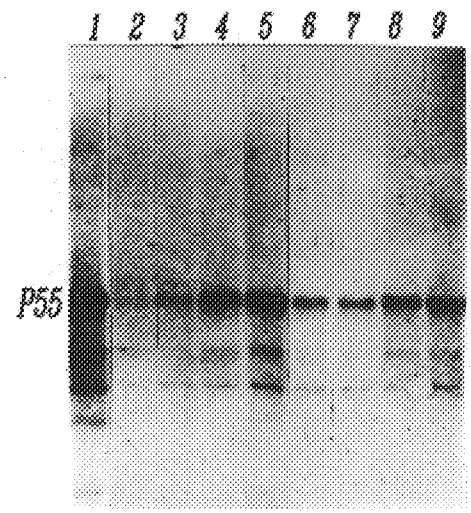

FIG. 5a shows that the antiviral effect of these compounds was gradually decreased when added at later intervals after cell infection. Whereas a 2 hour pre-treatment of the cells with 150 µg/ml of 342 induced full inhibition of protein synthesis, only a slight effect was observed when the drug was added 2 hours, and especially 4 hours after infection. No antiviral activity was seen when the drug was added 20 hours after infection.

Figure 5B:
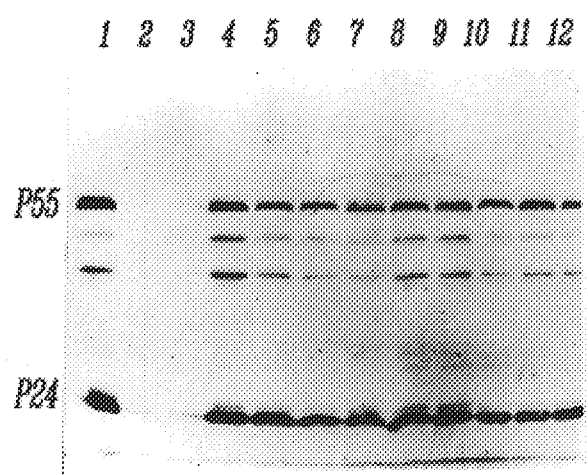

Also of note is the comparison of the antiviral effect of the compound of the present invention to that of traditional influenza antiviral adamantane analogues, amantadine and rimantadine hydrochloride. The cells were pretreated with amantadine and rimantadine at a concentration of 130 µg/ml. The compounds were added either 2 hours before adsorption or at 2, 4 and 20 hour intervals after adsorption. Slight antiviral effects were found even after cell pretreatment (FIGS. 5a and 5b). Lower concentrations of amantadine and rimantadine corresponding to that of the adamantane component only (molecular weight 350 atomic mass units) in the compounds (36 µg/ml) did not produce any effect on viral replication even after cell pretreatment (FIG. 5c).

These drugs were also shown to enhance the ability of adamantane to work as an antiviral agent against influenza A virus at even lower concentrations than amantadine and rimantadine hydrochloride.

It is hypothesized that the carrier provides more prolonged action as well as local accumulation of the adamantane groups and their cooperative interaction with sensitive viral and cellular sites, thus raising the possibility for regulating drug tropism, by directing adamantane to the plasma membrane. It is hypothesized that the polymeric carrier could prevent uncontrolled dissemination of adamantane molecules in the organism and in particular to the central nervous system.

It has been shown for influenza virus that amantadine hydrochloride interacts with M2 viral protein inside ionic channels in the viral envelope, and as a consequence virus uncoating is blocked. HIV is an enveloped virus and it is postulated that the polymeric amantadine analogue interacts with some particular protein in the HIV viral membrane interfering with viral uncoating during the fusion process. Administration of the polymeric carrier alone at a concentration equivalent to that present in the drug carrier did not produce an antiviral effect. FIG. 6 demonstrates the effectiveness of AS343 at different times of introduction with the HIV virus. As can be seen it is clear that the compounds are most active when introduced simultaneous with or soon after infection. Best results were seen when the cells were pretreated with the compounds prior to infection.

Dosage of the drug would be at non toxic levels up to 400 µg/ml, immediately after infection within 1 to 4 hours as after 4 hours little inhibition was seen. Dosage amounts would be sufficient to inhibit viral replication and due to the low toxicity could be enough to achieve a concentration of 400 µg/ml in the patient. Dosage could also include an aqueous acceptable carrier such as saline, phosphate buffer etc.

INHIBITION OF HIV INFECTION OF PRIMARY MACROPHAGES

Primary monocytes were obtained from HIV-1 seronegative volunteer donors by elutriation. Isolated monocytes were cultured in the presence of GM-CSF in order to allow differentiation into macrophages. Undifferentiated monocytes were removed by decanting and adherent macrophage cultures were incubated with compound AS343 with Amantadine or were left untreated and then infected with HIV-1 ADA-M which is a macrophage tropic strain of HIV-1. The drug was added either one to two hours before addition of virus or was added at the point of virus infection. Cells were incubated with virus for two hours. Virus containing medium was then removed and replaced with fresh medium either with or without antiviral compounds. Cultures were maintained over a period of three weeks. Samples of culture supernatant were harvested three times per week and analyzed for the presence of HIV-1 reverse transcriptase activity and for evidence of virus mediated cytopathogenic effects.

Concentrations of Amantadine as high as 100 µg/ml did not show any inhibitory effects on HIV replication as evidenced by amount of reverse transcriptase activity in culture supernatants. In contrast, concentrations of AS343 of 20 µg/ml and above strongly inhibited virus replication. AS343 concentrations required to inhibit HIV replication by 50% were in the 6 to 12 µg/ml range (approximately 0.5 µM). Concentrations of AS343 as high as 100 µg/ml did not have any deleterious effects on macrophage viability. The antiviral indices of AS343 for HIV infection of macrophages were in general agreement with those observed for HIV infection of CD4$^+$ lymphocytes.

Thus it can be seen that the invention accomplishes at least all of its objectives.

What is claimed is:

1. A polymeric adamantane analogue having the following formula:

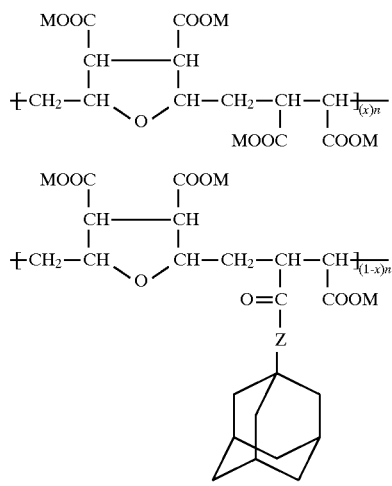

wherein said adamantane analogue is chemically linked to a nontoxic water soluble copolymer of maleic anhydride and divinyl ether said copolymer having a degree of polymerization wherein X is 0.10 to 0.25 and n is the respective degree of polymerization of 30 to 50;

Z is a spacer group a-b wherein a is NH or O; and b is lower alkylene $C_1$ to $C_8$; and M is an alkali metal, hydrogen or an amino group.

2. The polymeric adamantane analogue of claim 1 having the following formula:

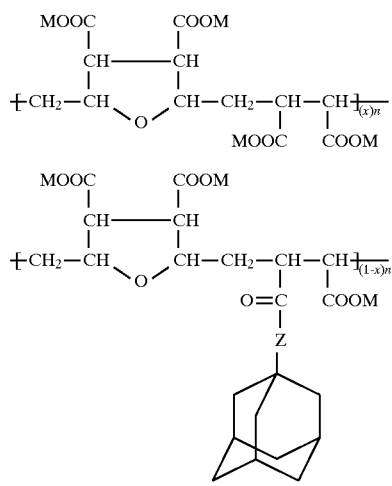

wherein X is 0.10 to 0.25;

n is the respective degree of polymerization approximately 30–50;

Z is a spacer group a-b wherein a is NH or O; and b is a lower alkylene $C_1$ or $C_2$; and M is an alkali metal, hydrogen or an amino group.

3. The compound of claim 2 wherein x is 0.21 and a is NH and b is ethyl.

4. The compound of claim 2 wherein x is 0.12 and a is NH and b is ethyl.

5. The compound of claim 2 wherein x is 0.19 and a is NH and b is methyl.

6. The compound of claim 2 wherein x is 0.10 and a is NH and b is methyl.

7. A pharmaceutical composition consisting essentially of a polymeric adamantane analogue according to claim 1 comprising: adamantane chemically linked to a nontoxic water soluble copolymer of maleic anhydride and divinyl ether, said copolymer having a degree of polymerization of 30–50, said chemical linkage accomplished by a Z spacer group a-b wherein a is NH or O; and b is selected from the group consisting of a lower alkylene $C_1$ to $C_8$; and a pharmaceutically acceptable carrier.

8. The pharmaceutical composition of claim 7 having the following formula:

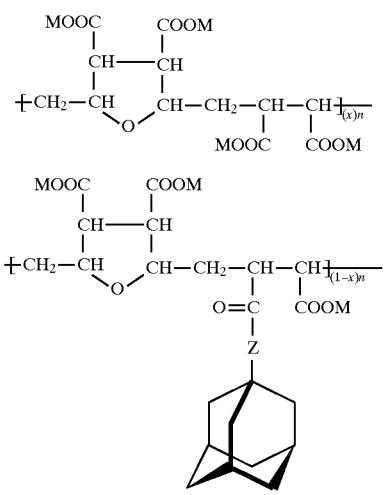

wherein X is 0.10 to 0.25;

n is the respective degree of polymerization approximately 30–50;

Z is a spacer group a-b wherein a is NH or O; and b is a lower alkylene $C_1$ or $C_2$; and M is an alkali metal, hydrogen or an amino group.

9. The composition of claim 8 wherein x is 0.21 and a is NH and b is ethyl.

10. The composition of claim 8 wherein x is 0.12 and a is NH and b is ethyl.

11. The composition of claim 8 wherein x is 0.19 and a is NH and b is methyl.

12. The composition of claim 8 wherein x is 0.10 and a is NH and b is methyl.

13. A method of inhibiting HIV infection in vitro consisting essentially of treating cells selected from the group consisting of MT4 and primary macrophages exposed to HIV-1 with an inhibitory effective amount of a polymeric adamantane analogue according to claim 1 consisting essentially of an adamantane chemically linked to a nontoxic water soluble copolymer of maleic anhydride and divinyl ether, said copolymer having a degree of polymerization of 30–50, said chemical linkage accomplished by a Z spacer group a-b where a is O or NH and b is selected from the group consisting of methyl and ethyl.

14. The method of claim 13 wherein said adamantane analogue is at a concentration of up to 400 µg/ml.

15. The method of claim 13 wherein said adamantane analogue has the following formula:

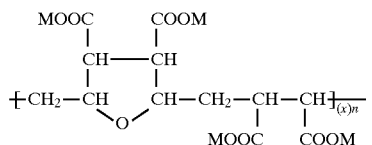

-continued

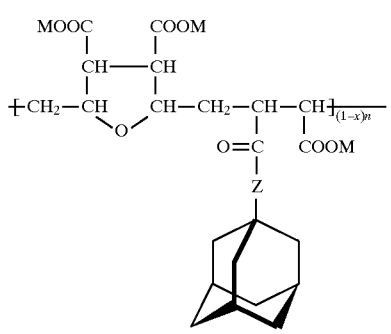

wherein X is 0.10 to 0.25;

n is the respective degree of polymerization approximately 30–50;

z is a spacer group a-b wherein a is NH or O and b is a lower alkyl $C_1$ to $C_8$ with $C_1$ or $C_2$ preferred; and M is an alkali metal, hydrogen or an amino group.

16. The composition of claim 15 wherein x is 0.21 and a is NH and b is ethyl.

17. The composition of claim 15 wherein x is 0.12 and a is NH and b is ethyl.

18. The composition of claim 15 wherein x is 0.19 and a is NH and b is methyl.

19. The composition of claim 15 wherein x is 0.10 and a is NH and b is methyl.

20. The method of claim 13 wherein said treatment occurs within 4 hours of absorbtion of the HIV 1 virus.

21. The method of claim 20 wherein said treatment is simultaneous with or immdiately after infection with HIV 1 virus.

22. The method of claim 13 wherein said cells are pretreated with said adamantane compounds before infection.

23. A polymeric adamantane analogue having the following formula:

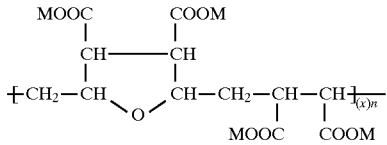

-continued

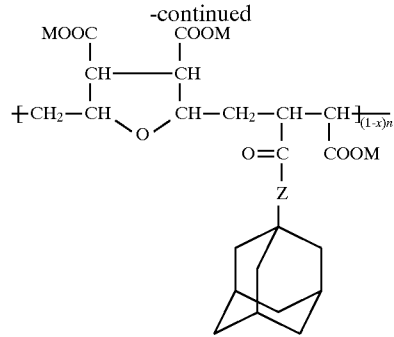

wherein X is 0.10 to 0.25;

n is the respective degree of polymerization approximately 30–50;

Z is a spacer group a-b wherein a is NH or O and b is a lower alkylene $C_1$ to $C_8$; and M is an alkali metal, hydrogen or an amino group.

24. A pharmaceutical composition having the following formula:

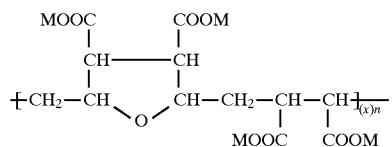

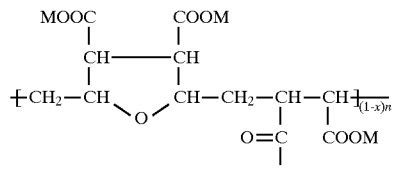

wherein X is 0.10 to 0.25;

n is the respective degree of polymerization approximately 30–50;

Z is a spacer group a-b wherein a is NH or O; and b is a lower alkylene $C_1$ to $C_8$; and M is an alkali metal, hydrogen or an amino group and a pharmaceutically acceptable carrier.

* * * * *